(12) United States Patent
Nazaret et al.

(10) Patent No.: US 10,562,090 B2
(45) Date of Patent: Feb. 18, 2020

(54) METHOD OF CONTROLLING A SUPERPLASTIC FORMING MACHINE AND CORRESPONDING MACHINE

(71) Applicants: AUROCK, Albi (FR); ASSOCIATION POUR LA RECHERCHE ET LE DÉVELOPPEMENT DES MÉTHODES ET PROCESSUS INDUSTRIELS (A.R.M.I.N.E.S.), Paris (FR)

(72) Inventors: Fabien Nazaret, Coufouleux (FR); Etienne Lebard, Albi (FR); Yannick Le Maoult, Albi (FR); Luc Penazzi, Toulouse (FR); Vanessa Vidal, Albi (FR); Vincent Velay, Carlus (FR)

(73) Assignees: ASSOCIATION POUR LA RECHERCHE ET LE DEVELOPPEMENT DES METHODES ET PROCESSUS INDUSTRIELS (A.R.M.I.N.E.S.), Paris (FR); AUROCK S.A.R.L., Albi (FR)

( * ) Notice: Subject to any disclaimer, the term of this patent is extended or adjusted under 35 U.S.C. 154(b) by 158 days.

(21) Appl. No.: 15/559,508

(22) PCT Filed: Apr. 7, 2016

(86) PCT No.: PCT/FR2016/050806
§ 371 (c)(1),
(2) Date: Sep. 19, 2017

(87) PCT Pub. No.: WO2016/162642
PCT Pub. Date: Oct. 13, 2016

(65) Prior Publication Data
US 2018/0117657 A1 May 3, 2018

(30) Foreign Application Priority Data

Apr. 9, 2015 (FR) .................................... 15 53052

(51) Int. Cl.
*B21D 26/027* (2011.01)
*B21D 26/055* (2011.01)
*G05B 19/042* (2006.01)

(52) U.S. Cl.
CPC ......... *B21D 26/027* (2013.01); *B21D 26/055* (2013.01); *G05B 19/042* (2013.01); *G05B 2219/23006* (2013.01)

(58) Field of Classification Search
CPC .... B21D 26/027; B21D 26/06; B21D 26/055; G05B 19/042; G05B 17/02; G05B 2219/23006
See application file for complete search history.

(56) References Cited

U.S. PATENT DOCUMENTS

| | | | |
|---|---|---|---|
| 4,474,044 A | 10/1984 | Leistner | |
| 5,277,045 A * | 1/1994 | Mahoney | B21D 26/055 72/60 |

(Continued)

*Primary Examiner* — Christopher E. Everett
(74) *Attorney, Agent, or Firm* — Paul & Paul (57) ABSTRACT

A method for controlling a superplastic forming machine for imprinting a shape on a sheet, the machine comprising: a cover; a vat; a press and a peripheral seal for gripping the sheet at its periphery and sealing a pressurized forming chamber delimited by the sheet; members for heating the sheet directly by radiation, these being arranged facing the sheet; a programmable controller. The method involves: determining an initial heating configuration; a finite-element simulation relating to the temperature of the sheet and performed in such a way as to have a temperature that is substantially consistent across the sheet and substantially constant during the course of the forming, in order to obtain a forming specification comprising at least a cycle of powering the heating members and a cycle of pressure in the (Continued)

forming chamber; programming the programmable controller according to the forming specification yielded by the previous simulation.

8 Claims, 7 Drawing Sheets

(56) References Cited

U.S. PATENT DOCUMENTS

| | | | | |
|---|---|---|---|---|
| 5,410,132 | A | 4/1995 | Gregg | |
| 6,884,966 | B2* | 4/2005 | Coleman | B21D 26/055 |
| | | | | 148/698 |
| 8,230,713 | B2* | 7/2012 | Krajewski | B21D 22/22 |
| | | | | 29/421.1 |
| 2003/0000275 | A1 | 1/2003 | Spence | |
| 2005/0067063 | A1* | 3/2005 | Schroth | B21D 26/021 |
| | | | | 148/511 |
| 2005/0218193 | A1* | 10/2005 | Comley | B23K 20/023 |
| | | | | 228/157 |
| 2006/0075799 | A1* | 4/2006 | Schroth | B21D 37/16 |
| | | | | 72/342.8 |
| 2006/0086774 | A1 | 10/2006 | Sanders | |
| 2006/0249560 | A1* | 11/2006 | Pitt | B21D 26/055 |
| | | | | 228/157 |
| 2009/0205394 | A1* | 8/2009 | Luckey, Jr. | B21D 26/055 |
| | | | | 72/379.2 |
| 2015/0143861 | A1* | 5/2015 | Sato | B21D 22/208 |
| | | | | 72/17.3 |

* cited by examiner

METHOD OF CONTROLLING A SUPERPLASTIC FORMING MACHINE AND CORRESPONDING MACHINE

CROSS-REFERENCE TO RELATED APPLICATIONS

This application is a national stage application of International Application PCT/FR2016/050806, filed Apr. 7, 2016, and claiming the priority of French Application 1553052 filed Apr. 9, 2015.

This invention relates to a machine used during a method of superplastic forming.

For the production of certain metal parts, aeronautical construction sometimes uses the method of superplastic forming. This method is based on the capacity of certain alloys, for example with a titanium base, to withstand a substantial deformation. These alloys, called superplastic alloys in what follows, can reach elongations up to sometimes beyond 1000% under certain conditions of temperature, pressure and deformation rate while materials with a non-superplastic behavior are generally deformed only by about 20%.

In order to produce a part with a superplastic alloy, a forming method known to those skilled in the art provides that a blank (flat sheet for example) is gripped between a tank and a cover. This set is maintained sealed by mechanical pressure under a press. Then by exerting a pressure, by pressurizing a space located between the cover and the sheet by a neutral gas, the sheet is deformed to hug a die housed in the tank. The pressure and the temperature (of about 900° C. for titanium alloys) must be perfectly controlled during the forming method in order to control the deformation speed which will make it possible to obtain large deformations. The cycle as such conventionally lasts about one hour. In the entire description, the term "sheet" designates the element made of superplastic material that undergoes the forming method; the term "blank" refers to the sheet at the beginning of the forming method, not having yet been subjected to deformation, while the term "final part" refers to the sheet at the end of the forming method.

Conventionally, the set of tools comprised of the tank, including the die, and of the cover is mounted at a uniform forming temperature. This set which is often made from refractory steel and which can weigh several tons requires several hours of heating. Once the target temperature of the tooling is reached, the cover is raised by the slide and a blank is placed on the tank then gripped between the die and the cover (the gripping provides a seal that allows for pressurization of a neutral gas that drives the displacement of the sheet) before being subjected to the gas punch. This opening of the tool causes a small drop in the temperature and it is therefore necessary to wait for the temperature of the tool to rise again. As the sheet is very thin, of a thickness usually between 1 and 6 mm, it is considered that it is at the temperature of the tooling. The latter is controlled by several thermocouples inserted into the tank and the cover. The temperatures are regulated by PID regulators (Proportional Integral Derivative regulator or corrector) that control heating resistances placed in metal or ceramic blocks whereon are fastened the elements of the tooling.

US2006/0086774 discloses a superplastic forming machine comprising such heating resistances (electrical cables) embedded in the die of the machine.

This conception consumes a substantial amount of energy as it requires maintaining several tons of refractory steel at about 900° C. and this despite the openings/closings of the press required for placing and unmolding the sheet. This method is also expensive because the down times outside the forming cycle are numerous (rise in temperature, stabilization of the temperature after opening) and penalizes the costs of production. As such, several techniques have been developed to directly heat the sheet and be dispensed with complete raising of the temperature of the tooling. This entails in particular the direct heating of the sheet by induction as proposed in U.S. Pat. No. 5,410,132 or by infrared emitters as described in U.S. Pat. No. 4,474,044. This heating of the sheet makes it possible to save substantially in terms of cycle time because it is no longer necessary to raise the temperature of all of the tooling.

In the case of infrared heating, the adjusting of the temperature of the sheet is difficult during forming. U.S. Pat. No. 4,474,044 proposes that sensors of the thermally insulated optical fiber type take the temperature of the sheet in-situ. However, during forming, the sensor/sheet distance varies and the emissivity of the sheet changes due to the more or less marked oxidation of the latter according to the operating conditions. This results in that the temperature measurement becomes fallible during forming.

US2003/0000275 proposes to monitor by IR camera the temperature distribution in order to regulate the heating of the sheet. However, the use of this technique requires the presence of additional windows in the cover which largely complicates the installation of the heating elements, the definition of the heating zones and the global technology of the cover in a press environment which provides the seal.

In addition, if the tooling is not at the target temperature of the sheet, the radiation of the sheet during its rise in temperature will introduce a surface gradient on the tooling that will disturb the temperature field of the sheet during the putting into contact.

This difficulty in obtaining reliable temperature data and the appearance of a temperature gradient due to the presence of a tooling at a lower temperature complicate the adjusting of the power of the emitters in order to obtain a consistent sheet temperature.

If the superplastic temperature of the sheet is not guaranteed, the forming can fail causing narrowing phenomena leading to local ruptures or introducing microstructure gradients that will deteriorate the mechanical properties of the final part.

The invention aims to overcome these disadvantages by proposing a method for controlling that makes it possible to guarantee a target temperature of the sheet when it is heated my members for heating directly, for example by infrared radiation or by laser, and with the possible presence of a die with a lower temperature.

The invention relates to a method of controlling a superplastic forming machine for imprinting a shape to be given in a sheet, said superplastic forming machine comprises:
 a cover,
 a tank,
 a press and peripheral means for gripping comprising a peripheral seal, both for gripping the sheet at its periphery, between the tank and the cover, and for sealing a forming chamber delimited by the sheet; note that the forming chamber can be located above the sheet, between the cover and the sheet in which case the tank can receive a lower die; as an alternative, the forming chamber can be located below the sheet, between the sheet and the tank as in EP 703019 in which case the cover can receive an upper die; it is also possible to provide two forming chambers, one above and the other below the sheet as in US2003/0000275;

members for heating directly by radiation, for example by infrared radiation (IR) or by laser or other radiation, arranged facing the sheet; these members for heating are for example installed under the cover in the case where the forming chamber is located between the cover and the sheet;

a gas conduit for the adjusting of the pressure in the forming chamber, and a programmable controller for controlling both the heating power of the members for heating and the pressure in the forming chamber.

The method according to the invention is characterized in that it comprises the following steps:

determining an initial heating configuration comprising for example the shape to be given, an architecture of the members for heating, a thickness of the blank (sheet before deformation), an architecture of the cover, etc.;

finite-element simulation relating to the temperature of the sheet and performed in such a way as to have a temperature that is substantially consistent across the sheet and substantially constant during forming, in order to obtain a forming specification comprising at least one cycle of powering the members for heating directly by radiation and a cycle of pressure of the forming chamber;

programming of the programmable controller according to the forming specification supplied by the simulation.

According to the shape to be given to the sheet, an initial heating configuration is first of all determined. This step consists in choosing:

an architecture of the members for heating: number of members, type of members (infrared or other wavelength, laser, etc.), maximum power that can be delivered, arrangement of the members (distribution in zones parallel to the sheet, initial distance with respect to the sheet, etc.). A such for example, it is possible to provide a greater density or a greater power of the members for heating facing zones of the sheet that must undergo more substantial deformations; note that it is possible to combine different types of members and/or different power levels;

an architecture of the cover: cover of a single piece or not, material or materials, shape, presence or not of reflectors, etc.

a thickness of the blank, where applicable, an architecture of the die. The shape of the upper face of the die is imposed, it corresponds to the shape to be given to the sheet, but other data can be chosen for the die: thickness, material, initial temperature, presence or not of heating elements by conduction integrated into the die, etc. The initial temperature of the die is preferably chosen arbitrarily; this can be the ambient temperature in order to avoid any prior heating phase of the die.

In the case of a superplastic forming machine of which the cover comprises a core and a reflector coating (cover not of a single piece), the data relative to the architecture of the cover in the initial configuration advantageously comprises the nature of the material of the core, as well as the number, the geometry and the arrangement of the reflectors.

The main constraints in the choice of the initial heating configuration are the size and the complexity of the part to be formed and the energy required to raise the temperature of the blank.

In order to succeed in obtaining a constant sheet temperature during forming, the invention proposes to make use of a finite-element simulation of the entire method. This phase of optimizing the heating must make it possible to result in a forming specification such as defined hereinabove (cycle of thermal power+cycle of pressure) and this according to the displacements of the sheet during the forming.

Finite-element simulation advantageously comprises, for each member for heating, an optimization of the heating power via, with the choice:

(i) the introduction, in the finite-element simulation, of a digital PID corrector (where PID usually designates "Proportional Integral Derivative") having as a setting a consistent temperature value (of the sheet) and preferably constant during forming. Note that it is possible to provide, in the initial heating configuration, one or several heating zones with each one comprising several members for heating. In this case, the same PID corrector is used for the various members for heating of the same zone and the PID correctors can be different from one zone to the other.

(ii) The minimization of the functional least squares into flows either by projection or by optimization (algorithm of the Gradient, of Levenberg-Marquardt . . . ) or by combining the two preceding methods of minimization in order to aim for a consistent and more preferably constant temperature during forming.

Possibly, if no forming specification is found during the step of simulation, the initial heating configuration is revised in such a way as to determine a new configuration, which means that certain data chosen is changed (e.g. material of the cover, number, distribution or maximum power of the members for heating, thickness of the blank, initial temperature of the die, etc.) and the finite-element simulation is executed again with this new configuration.

According to a possible characteristic, the step of simulation comprises the following prior phases:

determining limit conditions such as the type of gripping means;

determining physical laws relating to properties of the sheet and/or of the members for heating and/or of the cover, according to the initial heating configuration determined beforehand.

For example, the aforementioned physical laws are chosen from: laws relating to the thermomechanical behavior of the material of the sheet, laws relating to the thermo-optical properties of the material of the sheet from the ambient temperature to the forming temperature, laws relating to the thermo-optical properties of the members for heating, laws relating to the thermo-optical properties of the cover, etc.

Moreover, in the case of a superplastic forming machine comprising a lower die, housed in the tank and which has an upper face that reproduced as a hollow the shape to be given to the sheet, or in the case of a superplastic forming machine comprising an upper die, housed in the cover and which has a lower face that reproduced as a hollow the shape to be given to the sheet, the determined limit conditions more advantageously include the temperature of the die (lower or upper) and the thermomechanical properties of the sheet/die contact (friction coefficient among others).

The invention extends to a controlled superplastic forming machine according to the invention.

The invention extends to a device and a method of controlling a superplastic forming machine and to a controlled superplastic forming machine characterized as a combination by all or a portion of the characteristics mentioned hereinabove or hereinafter.

Other details and advantages of this invention will appear when reading the following description, which refers to the annexed schematic drawings and cover preferred embodiments, provided as non-limiting examples. In these drawings.

Figure 1:
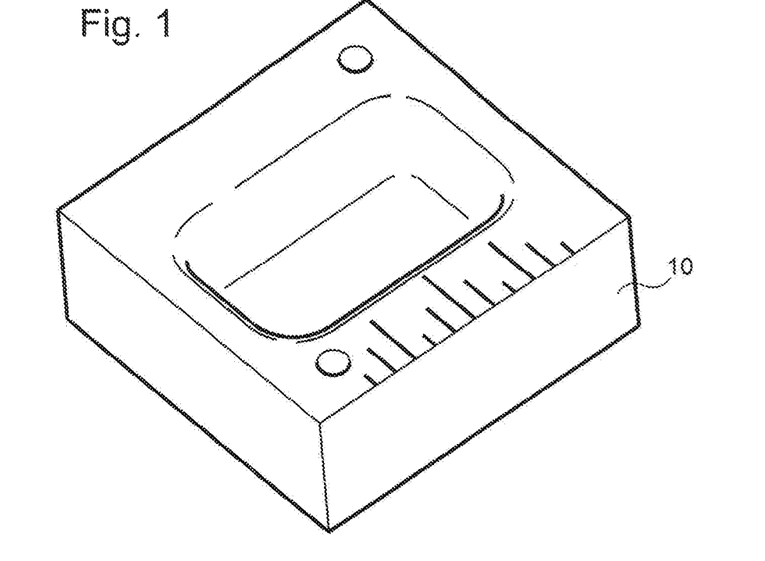
FIG. 1 is a perspective view of a lower die for the forming of a part.

In the non-limiting example described here, it is sought to form a final part made of a titanium alloy TA6V that has the given shape (as a hollow) by the lower die 10 shown in FIG. 1, from a sheet blank 100. The final part and the lower die 10 have a plane of symmetry YZ.

Figure 3:
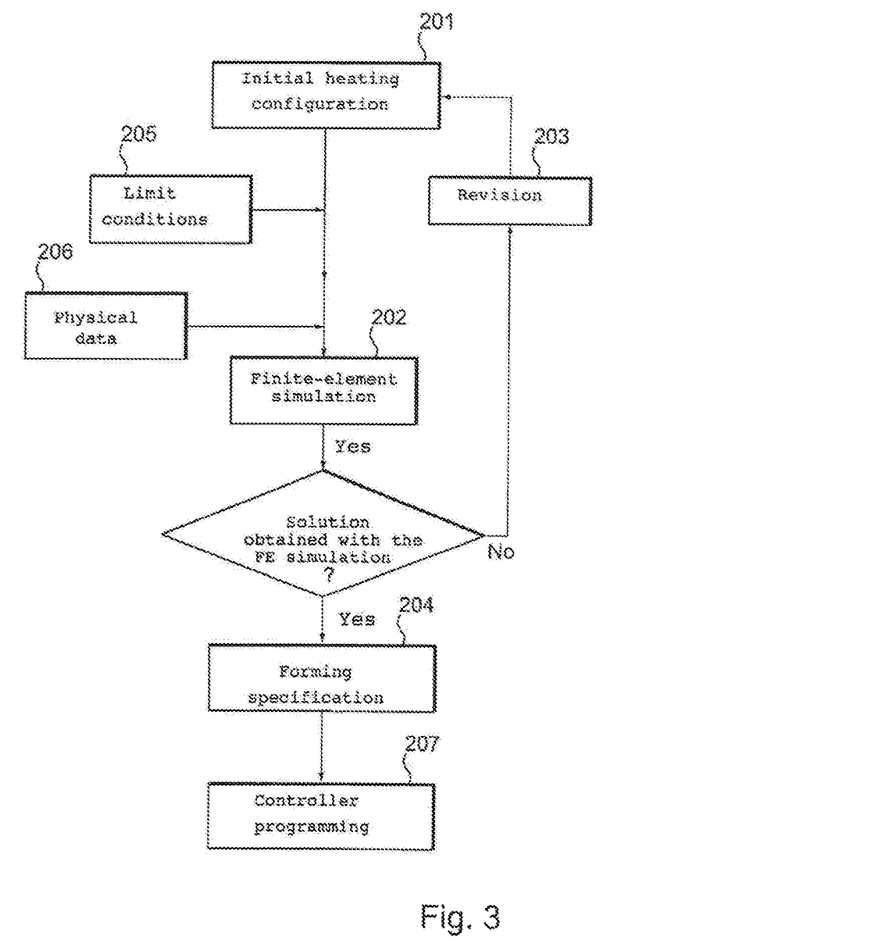
FIG. 3 is a flowchart that represents a method for controlling according to the invention.

According to the invention, of which the method is shown in FIG. 3, an initial heating configuration is first of all determined (step 201).

Figure 2:
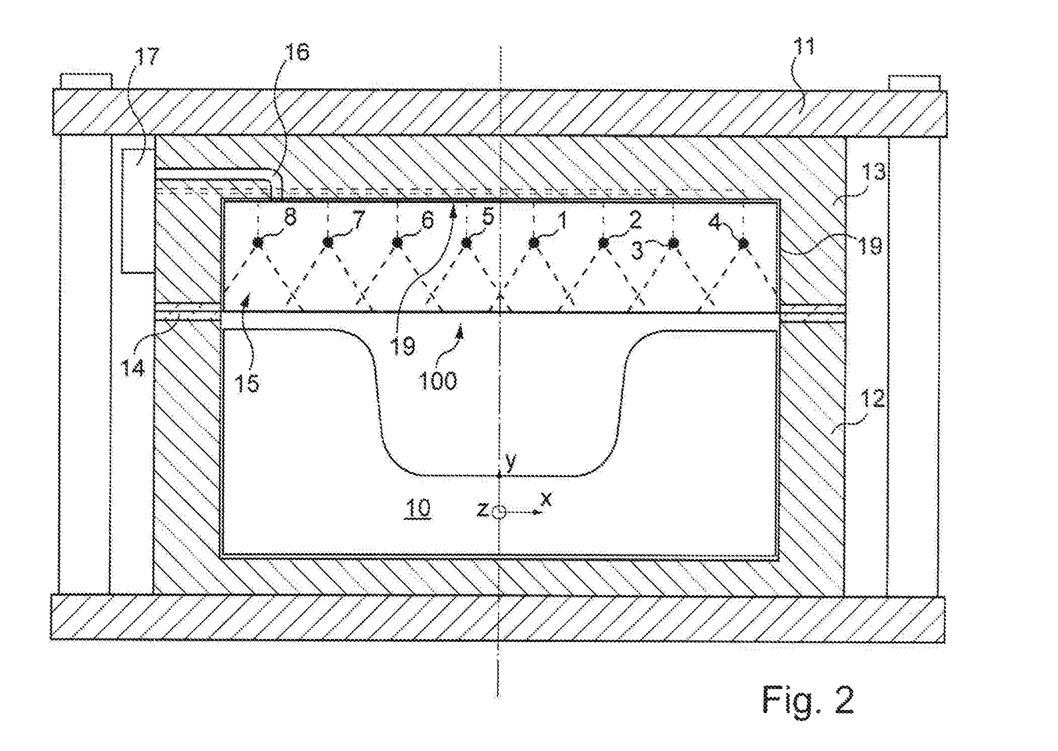
FIG. 2 is a diagrammatical view as a vertical cross-section of a superplastic forming machine that can be used with a device for controlling according to the invention.

Take as such as an example hypothesis of using the superplastic forming machine shown in FIG. 2. This machine comprises a press 11, a tank 12 and a cover 13, made of a refractory material (ceramic, metal or refractory concrete, whether or not reinforced), as well as peripheral gripping means comprising a holding-down device provided with a metal peripheral seal 14 providing the gripping and the maintaining of the sheet 100 at its periphery and the gas seal in the gripping zone of the sheet 100. The space delimited by the cover 13 and the sheet 100 is as such sealed to the gas and forms a forming chamber 15 (of variable volume) wherein a neutral gas, argon for example, can be injected under pressure by a gas inlet 16 arranged in the cover 13.

The superplastic forming machine also comprises the lower die 10 housed in the tank 12. This lower die can be heated directly, by lower press blocks, by the IR emitters described hereinafter, by the sheet 100 as the cycles occur. The lower the temperature of the lower die (or other possible tooling) is, the higher the performance of the method is in terms of rate and energy cost. For this reason, in the example described here, no member for heating dedicated to the lower die 10 is provided.

The superplastic forming machine further comprises members for heating directly, preferably arranged and carried out in such a way that it is possible to heat by zone. In the framework of the step 201 of determining an initial heating configuration, the number, the type, the arrangement and the initial distance with respect to the sheet 100 of the members for heating are chosen according to, in particular, the shape of the lower die 10. The main constraints in this choice are the size and the complexity of the part to be formed and the energy required to raise the sheet in temperature.

In the example shown, the initial heating configuration chosen comprises eight infrared lamps 1 to (also noted as "IR emitters" in what follows) each of 3.4 kW. In light of the symmetry of the lower die 10 with respect to the plane YZ, the IR lamps are chosen as cylindrical to the steering axis Z (axis of the length of the lower die 10) and are regularly distributed on either side of the plane of symmetry YZ. In other terms, the lamps 1 to 8 are arranged in the direction of the length of the part to be formed, with a spacing of 50 mm between two successive lamps. They are located 120 mm from the sheet 100 before any deformation of the latter. In addition, it is supposed that the cover 13, chosen here made of steel, is covered, facing the sheet 100 and IR lamps 1 to 8, with silica reflectors 19 for an increased lighting of the sheet 100 and better heating efficiency.

In order to succeed in obtaining a constant sheet temperature during forming, the invention proposes to make use of a finite-element simulation 202 of the entire method. This phase of optimizing the heating must make it possible to result in a forming specification 204 that establishes a heating power of the emitters by zone. If no solution is found, the architecture of the cover in 203 must be reviewed.

The finite-element simulation 202 can be carried out with one or several commercial finite-element codes. The software has to be able to implement simulations with a strong thermomechanical coupling and thermal simulations with radiative exchanges integrating the effects of form factors.

In order to supply this finite-element calculation, it is necessary to
- supply the geometrical data of the initial heating configuration defined in 201,
- specify, in 205, the limit conditions, which are the parameters for the physical implementation of the method of which the temperature of the lower die 10, the type of gripping and the thermomechanical properties of the sheet/die contact and those of the sheet/peripheral seal contact,
- enter, in 206, all of the thermo-optical properties of the IR emitters 1 to 8 and of the environment of the cover 13 as well as the thermo-optical and thermomechanical properties of the material that comprises the sheet 100 (this, from ambient temperature to the forming temperature) and of the material that comprises the lower die 10.

As such, a simulation of the heating of the sheet and of its forming can be carried out in 202 by considering the entire thermal environment of the sheet 100, i.e. the walls of the cover 13, the seal system 14 and the lower die 10. As such, the temperature of the lower die 10 (or other tooling used) is considered.

With this reference calculation, it is then possible to run an optimization of the power of the emitters during forming in order to provide a target temperature all throughout the forming and this despite the presence of tooling at a lower temperature.

This optimization can be carried out by the minimization of the functional least squares into flows either by projection or by optimization or by combining the two preceding methods of minimization in order to guarantee a consistent temperature on the sheet. However, such an approach is expensive in calculation time.

Alternatively, the optimization can be carried out by introducing a PID in the finite-element simulation via a co-simulation or a user subroutine. This PID takes as input information the temperature of the sheet during forming and it regulates the power of the IR emitters. The setting of the PID parameters can be carried out directly in the finite-element code or upstream via a scientific calculation software by considering a transfer function of the method. The simulation can comprise one or several PID according to the number of zones to adjust. With this approach, a single simulation is required to obtain in 204 a forming specification comprised of the cycle of pressure of the emitters during forming, by emitter or by zone according to the configuration retained, and of the corresponding cycle of pressure of the gas in the forming chamber. This method makes it possible to optimize the cycle of power of the emitters by taking into account the presence of the tools (here, the lower die 10) of which the temperature is lower and changes over the course of the cycle.

These cycles can then be entered, in 207, into the controller 17 of the press 11 that controls the forming of the sheet. The cycle of power of the IR emitters 1 to 8 will as such be imposed. Only the control sensors (not shown) will provide a temperature information during the cycle in zones of easy access for the sensors solely in order to ensure proper compliance of the given cycle by the simulation (and not for attempting to adapt in real time the lighting power as proposed in prior art). These sensors can be positioned in the lower die 10 or in the vicinity of the IR emitters 1-8 or on a zone that does not or hardly deforms of the sheet 100. The method described as such makes it possible to avoid the prior measurements of temperatures in-situ in the deformed zones of the sheet, said prior measurements would not make it possible to be able to correctly control the temperature of the sheet, with the use of these prior measurements having failed to obtain a consistent temperature of the sheet, the only one able to provide a part without a defect.

In the example described hereinabove aiming to supply a demonstration part that hugs the shape of the lower die 10 of FIG. 1, the target forming temperature is 870° C.

The IR lamps 1 to 8 and the coating plates 19 of the cover are characterized by an emissivity that depends on the temperature. The material of the sheet 100, here a titanium alloy TA6V, is also characterized by thermo-optical and thermomechanical properties that depend on the temperature. The mechanical behavior is of the elastoviscoplastic type.

The digital PID is installed via user program encoded in Fortran. This PID combined with the finite-element code will make it possible to control a received flow in order to guarantee a homogeneous temperature on the sheet 100. The finite-element commercial software known as ABAQUS© is used.

Figure 4:
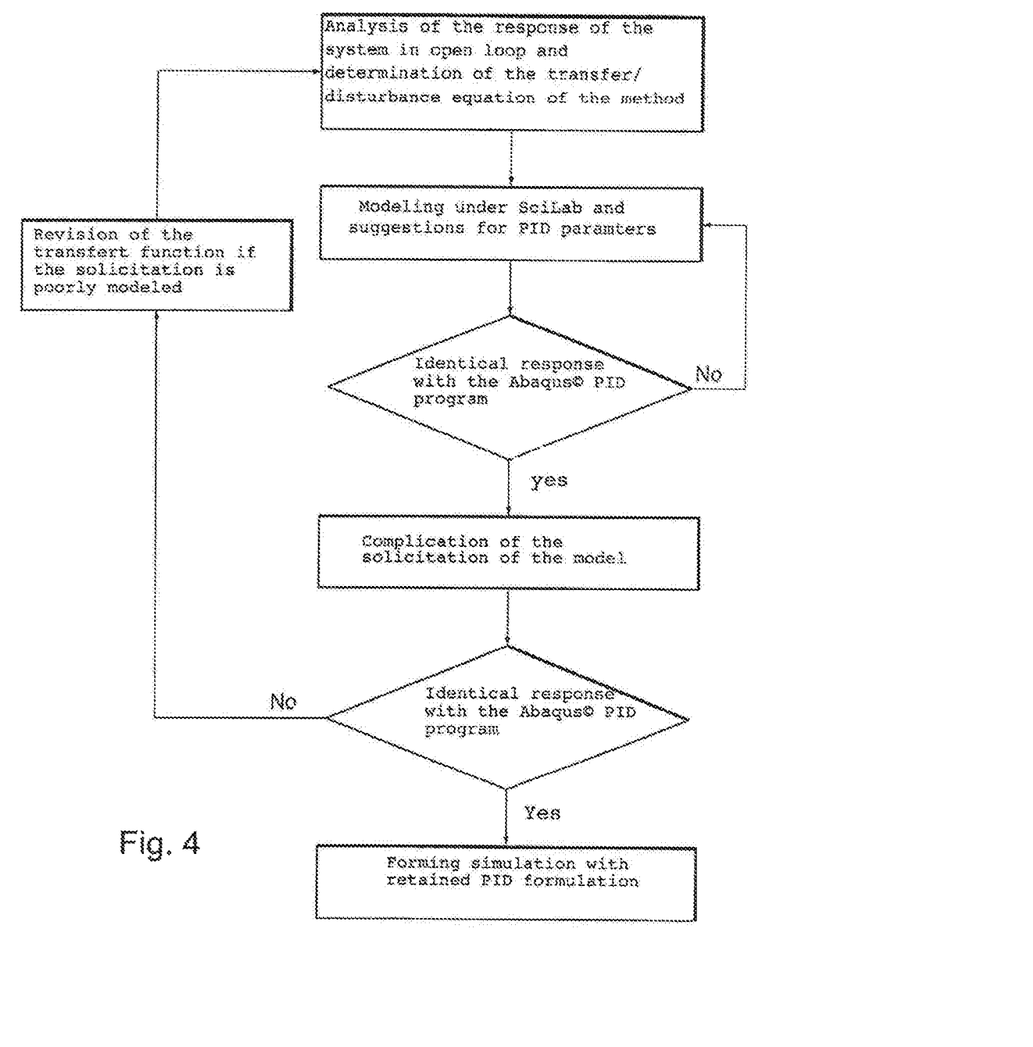
FIG. 4 is a block diagram that represents the process of adjusting a digital PID in a finite-element simulation implemented according to the invention.

The parameters of the digital PID are adjusted thanks to a simulation test case of an adjusting of a flat plate made of titanium alloy heated then placed on a block of refractory concrete that represents the lower die 10. The principle consists in analyzing the response of the system in an open loop (application of a flow of unregulated heat), proposing parameters of the PID (proportionality coefficient K, integration time constant Ti and derivation time constant Td) starting from a modeling of the transfer function of the method in the software known under the name of SCILAB, testing them in a user program in ABAQUS©, then complicating the model and seeing if the parameters remain pertinent. The first iteration made it possible to determine parameters K=23, Ti=0.01 s and Td=0 s. The block diagram of the process of adjusting the PID is shown in FIG. 4.

Figure 5:
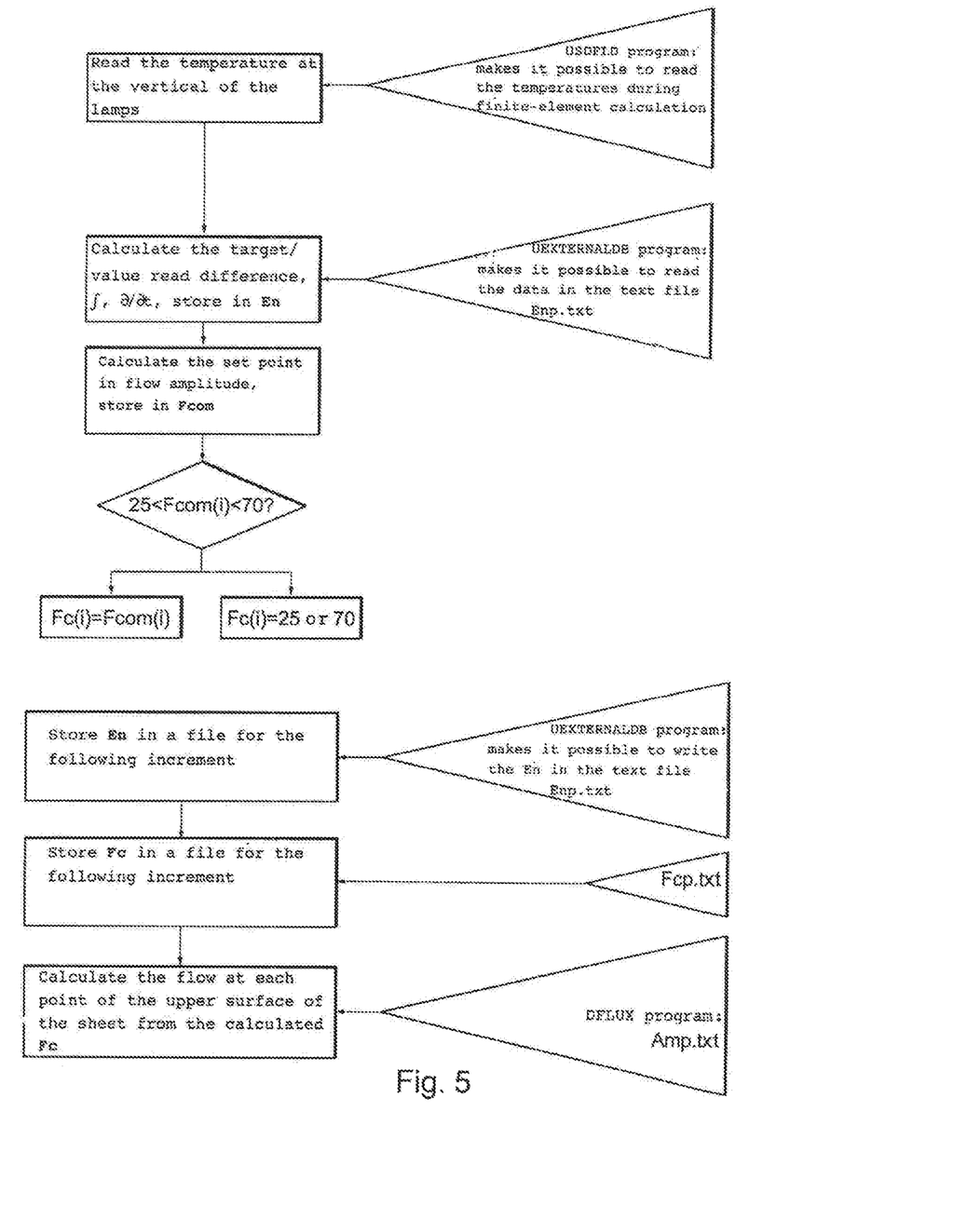
FIG. 5 is a block diagram that represents the installation of a digital PID in a finite-element simulation implemented according to the invention.

The principle of the program developed to install the PID regulator in ABAQUS© is disclosed in FIG. 5. In this example, the values of the flow are limited between 25 and 70 m W/mm².

Implementing the approach requires manipulating several files:

Enp.txt: storage of the error between the setting and the measurement, its integral and its derivative at each end of increment, Fcp.txt: storage of the lighting intensities of each lamp at the end of each increment, Amp.txt: storage at each increment of the lighting intensities of each lamp for post-processing and reconstruction of the light spatial profile.

ABAQUS© user program such as those known under the names USDFLD and UEXTERNALDB make it possible to read and write in the text files.

The flow control value $F_{com}$ is given by the following relationship:

$$F_{com}(i)=K_p*E_n(4i-3)+T_i*E_n(4i-2)+T_d*E_n(4i-1)$$

With:
$E_n(4i-3)$: target/measured difference on the lamp i
$E_n(4i-2)$: integral of this difference
$E_n(4i-1)$: derivative of this difference
$K_p$, $T_i$ and $T_d$ the parameters of the PID regulator Using the values of Fc(i) prescribed, ABAQUS©. recalculates the lighting profile according to the formula $$Flux1(x) = \sum_{1}^{4} Fc_i e^{-\left(\frac{x-\mu_i}{B_i}\right)^2}$$

($\mu_i$=coordinate x at the vertical of the lamps, $$B_i = k*Fc_i\left(1 - e^{\frac{Fc_i}{F_{sat}}}\right),$$

with $F_{sat}$ a saturation parameter that corresponds to the maximum flow. This flow profile is imposed in ABAQUS© with a subroutine of the DFLUX type and makes it possible to carry out a calculation increment with this load.

As such at each increment, the difference between imposed and set point temperature is calculated at each adjusted point and the PID regulator adapts the load in flow corresponding to the initially chosen lamp device.

In order to determine lighting curve to be imposed at each IR lamp 1 to 8, a finite-element simulation with a strong thermomechanical coupling is performed with the ABAQUS© software. The limit conditions applied in this calculation as well as the thermomechanical properties which are entered for each material present in the simulation are the following for the previously developed example:

- sheet made of TA6V 250 mm×1.4 mm. The material data (density, thermal conductivity, specific heat, parameter for the creep law, Young's modulus, Poisson's ratio) are according to the temperature;
- lower die 10 made of concrete. The material data (density, thermal conductivity, specific heat) are according to the temperature;
- between the sheet 100 and the lower die 10: radiative (at a distance) and conductive (at the contact between the sheet 100 and the lower die 10) exchanges; friction coefficient of 0.2 between the lower die and the sheet;
- cover and tanks made of steel; loss by convection and radiation of the cover 3 and of the tank 2 to the outside of the machine at ambient temperature (20° C.)
- in the forming chamber 15: optimized pressure profile and heat flow (regulated or not) on the upper face of the sheet 100;
- at the lower face of the sheet: radiative loss of the sheet 100 with an emissivity that depends on the temperature,
- loss by convection of the inside die 10 to the temperature inside the tank.

The simulation is performed in the central section in 2D with a hypothesis of flat deformations. A symmetry in the plane YZ is considered. At the initial state of the simulation, all is at 20° C. (ambient temperature, when means that we take as a hypothesis that no heating beforehand of the tools is carried out).

During the forming operation, the power of the lamps can be controlled. In order to be representative of the actual control possibilities of the method, the lighting intensity of each one of the four lamps 1 to 4 of the half-model will be controlled (one side of the plane of symmetry YZ) and not the lighting profile as a whole. The regulated output will correspond to the temperature of the nodes directly at the vertical of the lamps. The target temperature of 870° C. is set. The digital PID regulator described hereinabove is therefore implemented for the four lamps of the half-model.

Figure 6:
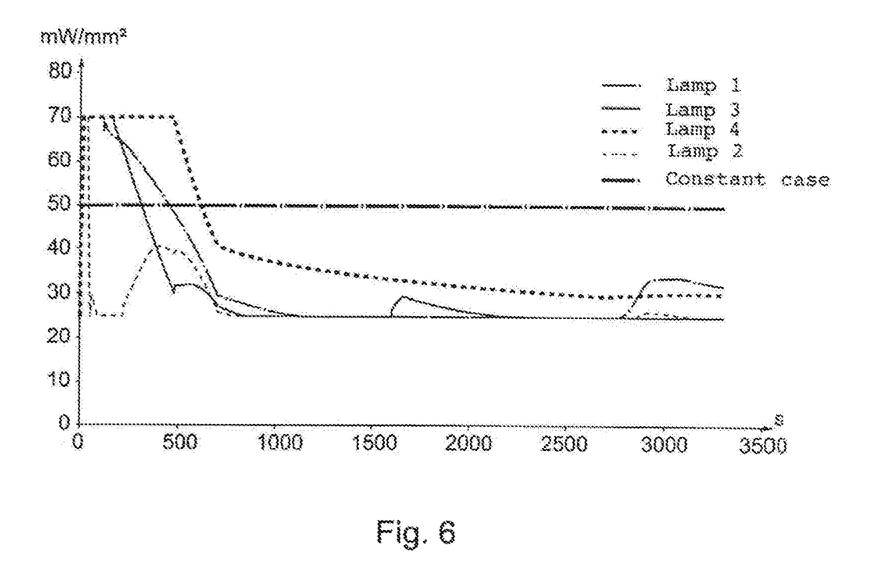
FIG. 6 is a diagram that shows, for each IR lamp of the machine of FIG. 2, the lighting intensity (on the ordinates) of the lamp during forming (time on the abscissa)

The simulation makes it possible to obtain the profile of the lighting intensity of the lamps shown in FIG. 6. Up to 1500 s, this is the phase of heating and of temperature stabilization and then of the forming portion. A case with the power of the lamps set to a constant value (and equal for each lamp) is also present for the purposes of comparison in order to evaluate the adding of the PID regulators. It is observed that the changes in lighting of the four lamps change over time and depend on their spatial position.

Figure 7:
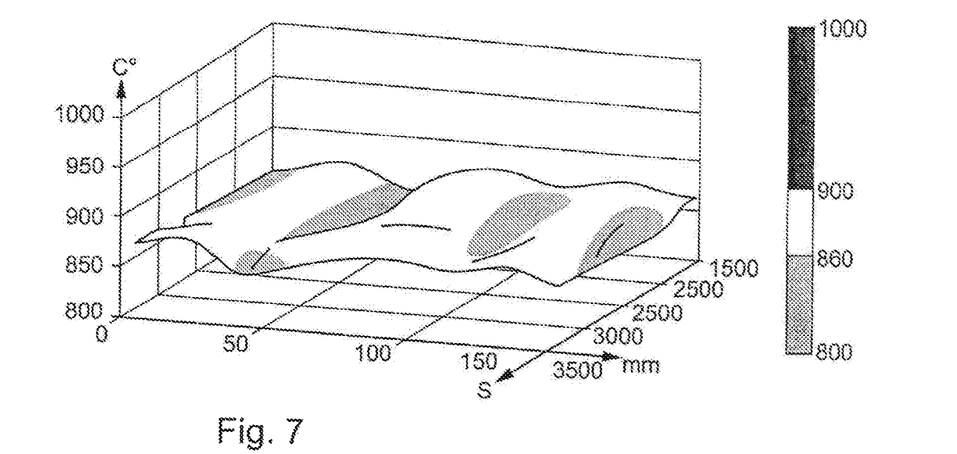
FIG. 7 is a diagram that shows a mapping (in 3D) of the temperatures of the sheet during forming, i.e. a diagram that shows, on the ordinates, the temperature of the sheet as a function, on the abscissa according to a first direction, of time and as a function, on the abscissa according to a second direction, the distance X with respect to the plane of symmetry YZ, when the lamps are regulated according to the invention.
Figure 8:
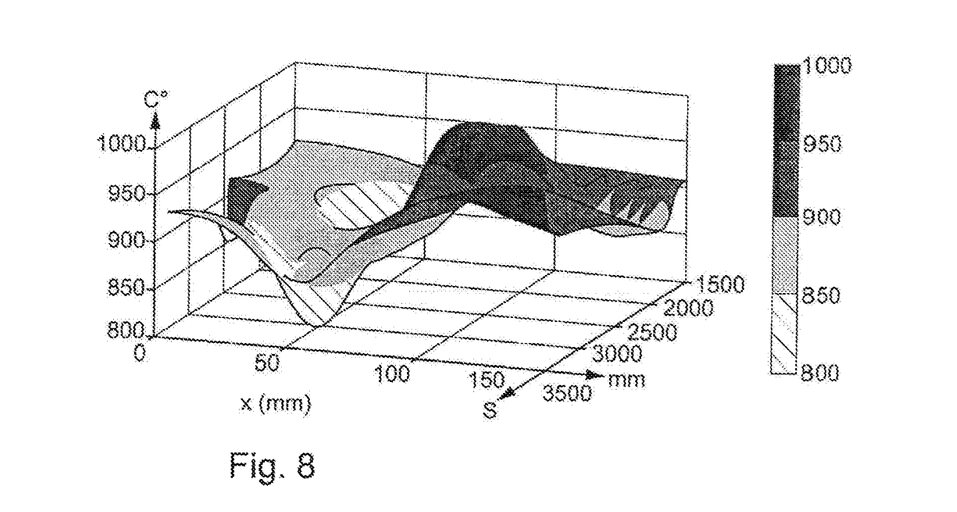
FIG. 8 is a diagram that shows a mapping (in 3D) of the temperatures of the sheet during forming, i.e. a diagram that shows (on the ordinates) the temperature of the sheet as a function of time (on the abscissa according to a first direction) and according to the distance X in relation to the plane of symmetry YZ (on the abscissa according to a second direction), when the lamps emit at a constant and equal power for all of the lamps.

FIGS. 7 and 8 make it possible to observe the mappings of temperatures calculated in a section of the sheet during forming between 1500 and 3500 seconds, with the position 0 mm corresponding to the plane of symmetry YZ. With a constant lamp power (FIG. 8), an average value is reached on this phase (average of the temperatures of all of the points for all of the calculation increments) of 901° C. but with a standard deviation of 35° C. and extreme values of 820° C. and 960° C. With the implementing of the digital PIDs (FIG. 7), an average temperature of 862° C. is obtained (for a target of 870° C.) with a standard deviation of 17° C. and extreme values of 830° C. and 880° C.

It is possible to see the gain in terms of homogeneity and of control in the temperature between the case where the power of each lamp is adjusted according to the invention (FIG. 7) and a case where the power of the lamps is maintained constant and equal for all of the lamps (FIG. 8).

Figure 9:
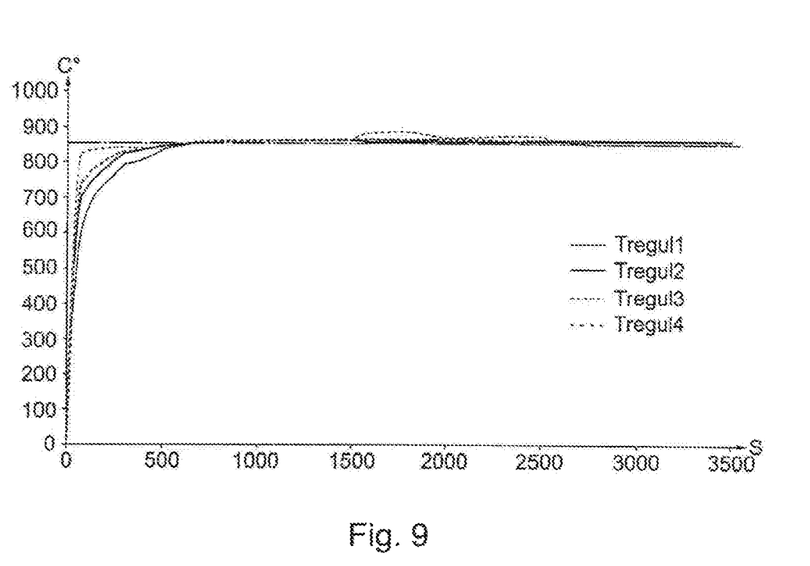
FIG. 9 is a diagram that shows the change in the temperature of the center of the sheet when the lamps are regulated according to the invention, with this diagram showing, for each node used by a subroutine for the regulating, the temperature (on the ordinates) of the node as a function of time (on the abscissa)
Figure 10:
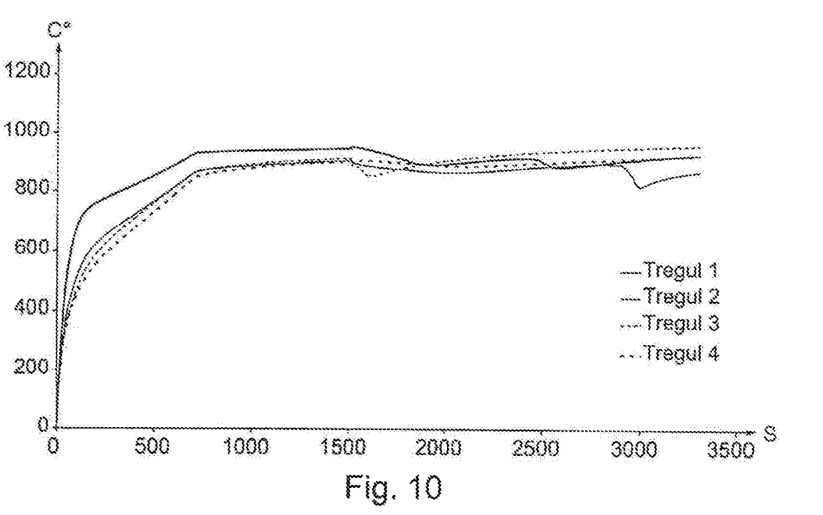
FIG. 10 is a diagram showing the change in the temperature of the center of the sheet when the lamps emit at a constant and equal power for all of the lamps, with this diagram showing, for each one of the nodes defined in FIG. 9, the temperature (on the ordinates) of the node as a function of time (on the abscissa).

The comparison of the temperatures of the sheet with the regulation nodes (points located to the right of the various lamps) in case of regulation according to the invention (FIG. 9) with the temperatures of the same points in the case of a constant and equal power for all of the lamps (FIG. 10) shows also that the adjustment according to the invention makes it possible to reach the forming temperature more quickly and correctly maintain the latter (although it varies more greatly in the absence of regulation according to the invention). Note that the references "Tregul1" to "Tregul4" that appear in FIGS. 9 and 10 designate the temperature of the regulation nodes to the right, respectively, of the lamps 1 to 4 (see FIG. 2 for the position of said lamps).

Once this step of simulation has been carried out, the change in lighting obtained will make it possible to control the power of the lamps during the forming by guaranteeing a consistent temperature during the latter. As such this method of adjusting makes it possible to implement the direct heating of the sheet by IR lamps for the superplastic forming by integrating the change in the sheet/lamp distance for each lamp and the various thermal exchanges that take place during the forming in this configuration.

The invention can be the object of many alternatives in relation to the embodiments described hereinabove and shown, for example in the choice of the software used, as long as the latter remain within the scope defined by the annexed claims.

The invention claimed is:

1. Method of controlling a superplastic forming machine for imprinting a shape on a sheet (100), with the machine comprising
   - a cover (13),
   - a tank (12),
   - a press (11) and a peripheral seal (14) for the gripping of the sheet (100) at its periphery, between the tank and the cover, and for sealing of a forming chamber (15) having a pressure and delimited by the sheet,
   - members for heating directly by radiation (1-8), arranged facing the sheet (100), the members for heating being positioned in the forming chamber, the members for heating being infrared heaters;
   - a gas conduit (16) for the adjusting of the pressure in the forming chamber (15),
   - a programmable controller (17) for controlling both the heating of the members for heating and the pressure in the forming chamber, with the method being characterized in that it comprises the following steps:
   - determining (201) an initial heating configuration comprising a shape to be given, an architecture of the members for heating (1-8), a thickness of the sheet (100) before deformation, an architecture of the cover (13);
   - performing a finite-element simulation (202) of the temperature of the sheet and performed in such a way as to have a temperature that is substantially consistent across the sheet and substantially constant during forming, in order to obtain (204) a forming specification comprising at least one cycle of powering the members for heating and a cycle of pressure of the forming chamber;
   - programming (207) the programmable controller of the superplastic forming machine according to the forming specification supplied by the simulation.

2. Method according to claim 1, the finite-element simulation having a functional least squares, characterized in that a finite-element simulation comprises, for each member for heating, an optimization of the heating power using a technique chosen from: an introduction, in the finite-element simulation, of a digital PID corrector having as a setting a consistent temperature value on the sheet; a minimization of the functional least squares into flows either by projection or by optimization or by combining the two preceding methods of minimization in order to guarantee a consistent temperature on the sheet.

3. Method according to claim 1, characterized in that, if no forming specification is found during the step of finite-element simulation, the initial heating configuration is revised (203) in such a way as to determine a new configuration, and the finite-element simulation is executed (202) again with this new configuration.

4. Method according to claim 1, characterized in that the step of simulation comprises the following prior phases:
 determining (205) limit conditions;
 determining (206) physical laws concerning the properties of the sheet (100) and/or of the cover (13) and/or of the members for heating (1-8), according to the initial heating configuration determined hereinabove (201).

5. Method according to claim 4, characterized in that the determined physical laws (206) include laws relating to thermomechanical behavior of the material of the sheet (100), laws relating to thermo-optical properties of the material of the sheet (100) from an ambient temperature to a forming temperature, laws relating to thermo-optical properties of the members for heating (1-8), laws relating to [the]thermo-optical properties of the cover (13).

6. Method according to claim 4 for the controlling of a superplastic forming machine comprising in addition a die housed in the tank (12) or the cover (13) and having a face that reproduces the shape to be given to the sheet (100), characterized in that the determined limit conditions (205) include in addition the temperature of the die (10) and the thermomechanical properties of the sheet/die contact.

7. Method according to claim 1 for the controlling of a superplastic forming machine of which the cover (13) comprises a core and a reflector coating (19), characterized in that the data relative to the architecture of the cover in the initial configuration comprise the nature of the material of the core, as well as the number, the geometry and the arrangement of the reflectors (19).

8. Superplastic forming machine for the forming of a sheet (100) comprising:
 a cover (13),
 a tank (12),
 a press (11) and a peripheral seal (14) both for the gripping of the sheet (100) at its periphery, between the tank (12) and the cover (13), and for sealing of a forming chamber (15) having a pressure and delimited by the sheet (100),
 members for heating directly by radiation (1-8), arranged facing the sheet (100), the members for heating being positioned in the forming chamber, the members for heating being infrared heaters;
 a gas conduit (16) for the adjusting of the pressure in the forming chamber (15),
 a programmable controller (17) for controlling both the heating of the members for heating (1-8) and the pressure in the forming chamber (15),
characterized in that the programmable controller (17) is programmed according to a forming specification supplied by the method of:
 determining (201) an initial heating configuration comprising a shape to be given, an architecture of the members for heating (1-8), a thickness of the sheet (100) before deformation, an architecture of the cover (13);
 performing a finite-element simulation (202) of the temperature of the sheet and performed in such a way as to have a temperature that is substantially consistent across the sheet and substantially constant during forming, in order to obtain (204) a forming specification comprising at least one cycle of powering the members for heating and a cycle of pressure of the forming chamber;
 programming (207) the programmable controller of the superplastic forming machine according to the forming specification supplied by the simulation.

\* \* \* \* \*